US006851506B2

(12) United States Patent
Bovio

(10) Patent No.: US 6,851,506 B2
(45) Date of Patent: Feb. 8, 2005

(54) HEAT SHIELD FOR EXHAUST INSULATOR

(75) Inventor: Vincent G. Bovio, Ann Arbor, MI (US)

(73) Assignee: Trelleborg YSH, Inc., South Haven, MI (US)

( * ) Notice: Subject to any disclaimer, the term of this patent is extended or adjusted under 35 U.S.C. 154(b) by 52 days.

(21) Appl. No.: 10/021,207

(22) Filed: Dec. 7, 2001

(65) Prior Publication Data

US 2003/0106735 A1 Jun. 12, 2003

(51) Int. Cl.[7] ............................................. B60K 13/04
(52) U.S. Cl. .................... 180/296; 180/309; 248/60
(58) Field of Search ............... 180/89.2, 296, 180/309, 189, 69.1, 69.2; 181/208, 207, 209, 243, 114, 212, 227, 228; 248/60, 610, 634, 611, 58, 59, 62, 65, 203; 267/292, 281, 140.11, 140, 141, 141.2, 141.3, 219

(56) References Cited

U.S. PATENT DOCUMENTS

| | | | | |
|---|---|---|---|---|
| 2,267,431 A | * | 12/1941 | Steensen ..................... 248/60 |
| 3,161,252 A | * | 12/1964 | Brown ....................... 180/89.2 |
| 3,746,127 A | * | 7/1973 | Leventhal .................. 181/243 |
| 3,863,445 A | * | 2/1975 | Heath ......................... 180/309 |
| 3,891,191 A | * | 6/1975 | Choules et al. ............ 248/610 |
| 3,960,232 A | * | 6/1976 | Hubbell, III ................ 180/309 |
| 4,116,411 A | * | 9/1978 | Masuda ....................... 248/60 |
| 4,349,078 A | * | 9/1982 | Shimada et al. ........... 180/89.2 |
| 4,415,391 A | * | 11/1983 | Reid ............................ 248/60 |
| 4,424,960 A | * | 1/1984 | Dan et al. .................. 267/219 |
| 4,465,252 A | * | 8/1984 | Donovan et al. ............ 248/60 |
| 4,634,088 A | * | 1/1987 | Schad ......................... 248/60 |
| 4,638,965 A | * | 1/1987 | De Bruine et al. .......... 248/59 |
| 4,727,957 A | * | 3/1988 | Fujita ......................... 248/60 |
| 5,032,342 A | * | 7/1991 | Drabing et al. ............ 264/263 |
| 5,507,463 A | * | 4/1996 | Kobylinski et al. ........ 248/610 |
| 5,673,877 A | * | 10/1997 | Karner et al. ................ 248/58 |
| 5,957,415 A | * | 9/1999 | Perea .......................... 248/58 |
| 6,223,849 B1 | * | 5/2001 | Godel et al. ................ 180/296 |
| 6,402,119 B1 | * | 6/2002 | Miska ........................ 248/610 |
| 6,572,070 B2 | * | 6/2003 | Arciero et al. ............. 248/610 |

FOREIGN PATENT DOCUMENTS

| | | | | |
|---|---|---|---|---|
| DE | 3643698 C1 | * | 7/1988 | ............ F16L/3/14 |
| DE | 4139717 A1 | * | 6/1993 | .......... B60K/13/04 |
| FR | 2678221 A1 | * | 12/1992 | .......... B60K/13/04 |
| GB | 2273478 A | * | 6/1994 | .......... B60K/13/04 |
| JP | 59-034931 | * | 2/1984 | .......... B60K/13/04 |
| JP | 59-068515 | * | 4/1984 | .......... B60K/13/04 |
| JP | 60-082438 | * | 5/1985 | .......... B60K/13/04 |
| JP | 61-258914 | * | 11/1986 | ............ F16F/15/02 |
| JP | 02-092727 | * | 4/1990 | .......... B60K/13/04 |
| JP | 03-157225 | * | 7/1991 | .......... B60K/13/04 |

* cited by examiner

*Primary Examiner*—Hau Phan
(74) *Attorney, Agent, or Firm*—Sand & Sebolt

(57) ABSTRACT

An exhaust insulator adapted for use in a motor vehicle exhaust system includes a vibration dampening mechanism and a heat shield. The heat shield snaps into position around the vibration dampening mechanism. The insulator is used in conjunction with a hanger which connects the exhaust pipes to the vehicle chassis.

34 Claims, 5 Drawing Sheets

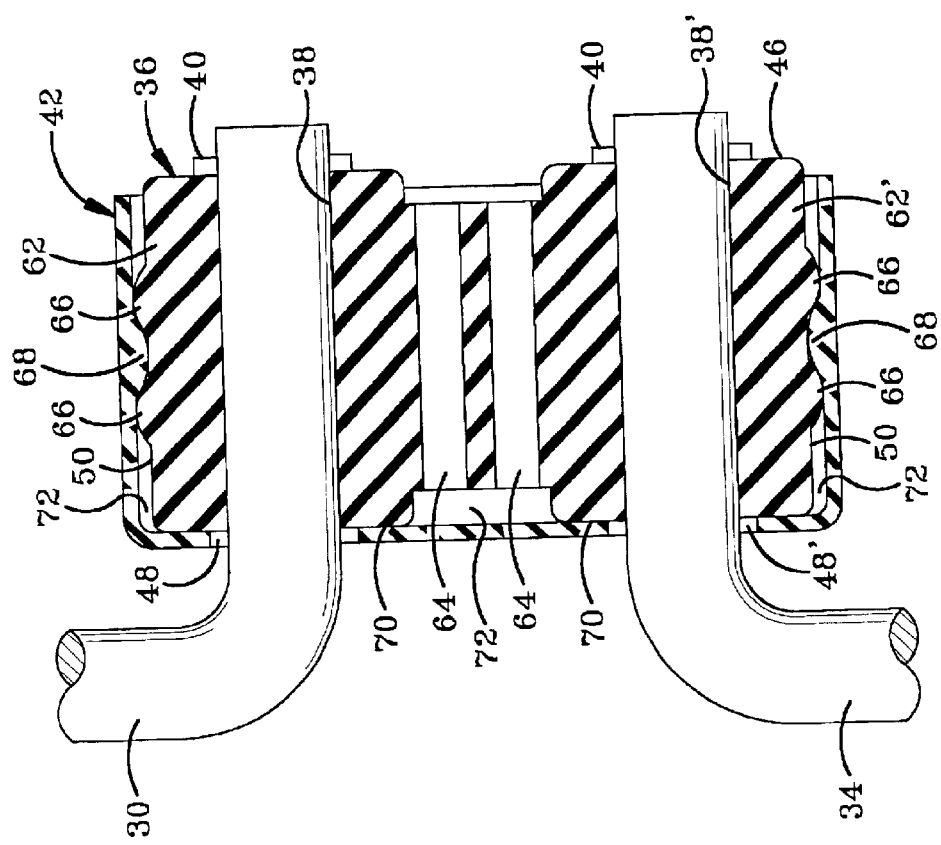
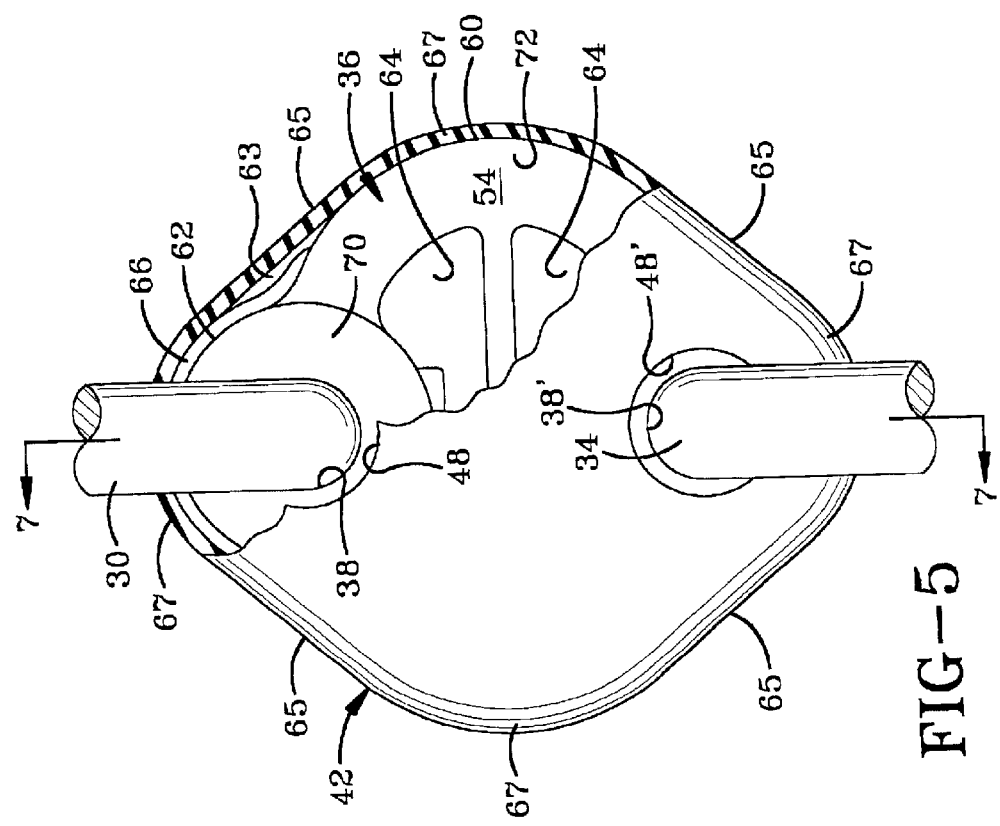

HEAT SHIELD FOR EXHAUST INSULATOR

BACKGROUND OF THE INVENTION

1. Technical Field

This invention relates generally to insulators for vehicle exhaust systems and more specifically to an insulator for a vehicle exhaust system that includes a shield that snaps onto the insulator to protect it from excessive heat build-up and consequent possible failure due to heat damage.

2. Background Information

As motorists drive their vehicles over roads, they encounter potholes, bumps and other uneven surfaces that shake and jolt the vehicle body. These vibrations and jarring shocks to the vehicle body may cause damage to various components and connections. One of the systems of the vehicle that may be damaged by such vibrations is the exhaust system. The vibrations may cause cracks in the welds between components of the system.

In order to dampen these vibrations and to reduce the potential side effects, manufacturers have customarily used rubber vibration insulators or dampers in the connections between the exhaust system and the vehicle chassis. These vibration dampers have worked fairly well until recently.

In the past, exhaust systems on automobiles included fairly long, straight sections of pipe that allowed air to flow freely and rapidly from the engine to the exterior. Hangers connected the exhaust pipes to the vehicle bodies and dampers were located periodically along the length of these pipes to support the system and insulate occupants from vibration in the pipes. The exhaust system allowed exhaust gases to escape from the vehicle and also allowed heat from the engine to be rapidly dissipated.

Specifically, elastomeric hangers provided a number of benefits, including retention of the exhaust system to the car, as well as providing a flexible attachment that could accommodate expansion and contraction of the exhaust system as a result of heating and cooling during vehicle operation. Still further, these elastomeric bushings would isolate vibrations in the system and system noise from reaching the vehicle occupants.

Problems with this system began to appear with the introduction of catalytic converters. Catalytic converters are used to reduce the release of noxious gases into the atmosphere. They tend to work best if they are heated and consequently they are located as near to the engine block as possible, but sufficiently far away to prevent the device from overheating and being damaged. Exhaust gases are hottest when they exit the engine and manufacturers have utilized this heat to heat up the catalytic converters to improve their performance. Sometimes manufacturers preheat the catalytic converter using a small electric resistance heater. Catalytic converters restrict the free airflow through the exhaust system. The noxious gases are filtered out, but the converters drastically reduce the rate of heat loss through the exhaust system. Heat tends to build up in the area surrounding the catalytic converter and through the rest of the exhaust system. As the catalytic converter slows the air flow through the exhaust system, the rate of heat loss from the system decreases and consequently there is a greater increase in the temperature of the exhaust pipes. This heat build-up in the rest of the system may result in the vibration insulators becoming overheated and damaged. The insulator may fail, resulting in an increase in disturbances from the exhaust system and ultimately in damage to or loss of the exhaust system itself.

Manufacturers have attempted to shield components from the heat build up caused by the reduction in the exhaust gas flow rate. Their attempts have included the use of metallic heat shields positioned above the catalytic convertor and along the exhaust system in order to prevent heat from entering the cab of the vehicle and to prevent fires and the like when heat is positioned adjacent to wire harnesses or other flammable material. Metallic shields are expensive to manufacture and fairly difficult to install if a problem is diagnosed. As such, these shields have not been utilized to protect exhaust insulators or vibration dampeners. As the exhaust system is relatively cheap to replace, this type of shield has not traditionally been used to protect the exhaust system. Other possible solutions to this problem have been the use of air spaces or gaps to separate components from each other, as well as the use of double layer exhaust pipes which include an air space between the two layers. However, these solutions have been fairly costly and it has been difficult to retrofit cars with these systems. The industry desires a device that addresses these problems.

BRIEF SUMMARY OF THE INVENTION

The invention provides a heat shield for a vibration insulator that is used with a vehicle exhaust system. The vibration insulator is adapted for use in a motor vehicle having a chassis, an engine and an exhaust system that includes exhaust pipes. The heat shield is disposed over a portion of the vibration insulator to reduce the heat that reaches the vibration insulator, thereby reducing the likelihood of the failure of the vibration insulator.

BRIEF DESCRIPTION OF THE SEVERAL VIEWS OF THE DRAWINGS

FIG. 5 is a partially cut away front view of the vibration insulator and heat shield taken through line 5—5 of FIG. 4.

FIG. 7 is a partial cross-section of the vibration insulator, heat shield and hanger bars taken through line 7—7 of FIG. 5.

DETAILED DESCRIPTION OF THE INVENTION

Figure 1:
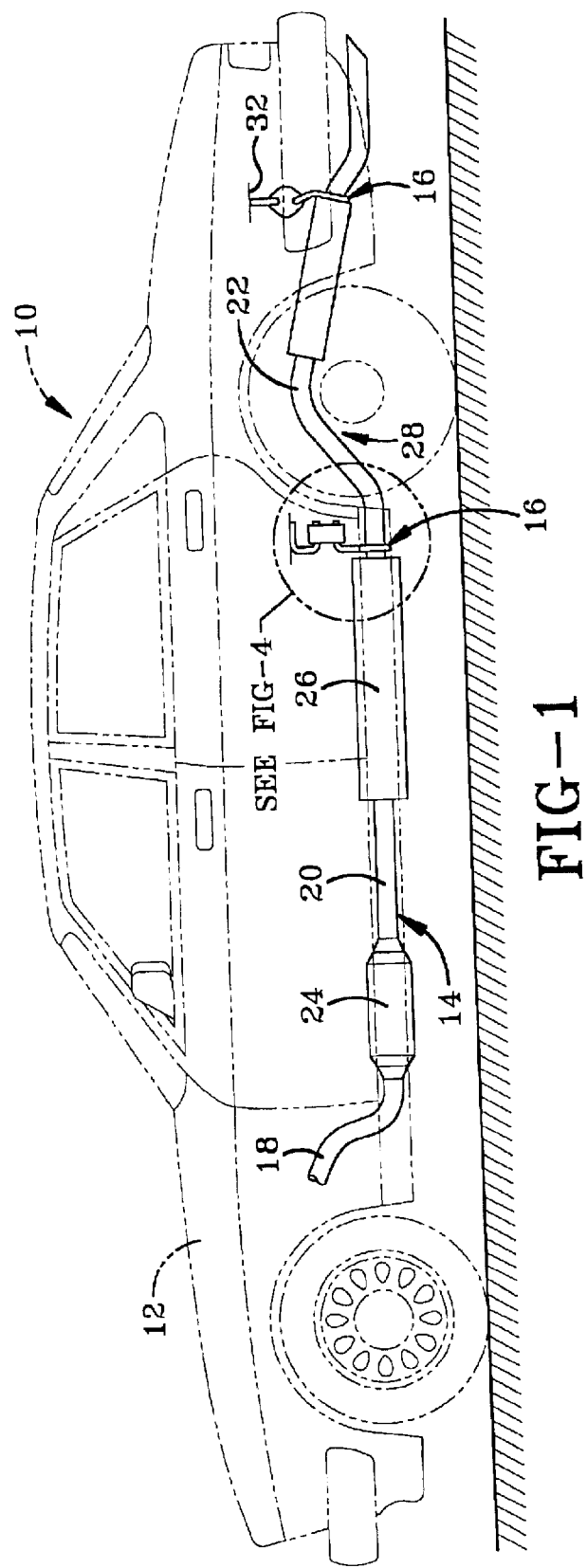
FIG. 1 is a side view of an exhaust system for a motor vehicle showing portions of the vehicle body in phantom.

Referring to FIG. 1, there is generally shown an automobile 10 having a body 12 and an exhaust system 14 connected to the body 12 by at least hangers 16. Other parts of the automobile 10 are not shown in detail for clarity and these other parts are of conventional structure and function and are know to those skilled in the art.

Exhaust system 14 is connected at one end to a manifold (not shown) that funnels exhaust gases from the cylinders (not shown) into exhaust system 14. A number of exhaust pipe sections 18, 20, 22 connect the components of exhaust system 14 together. A catalytic converter 24 is connected to the manifold (not shown) by pipe section 18 and to a muffler 26 by pipe section 20. Muffler 26 is connected to a tail pipe 28 by pipe section 22. Tail pipe 28 is open to the atmosphere to allow the exhaust gases to escape from the exhaust system 14. The various components of exhaust system 14 are connected together in the conventional manner by the use of welds and clamps.

Figure 4:
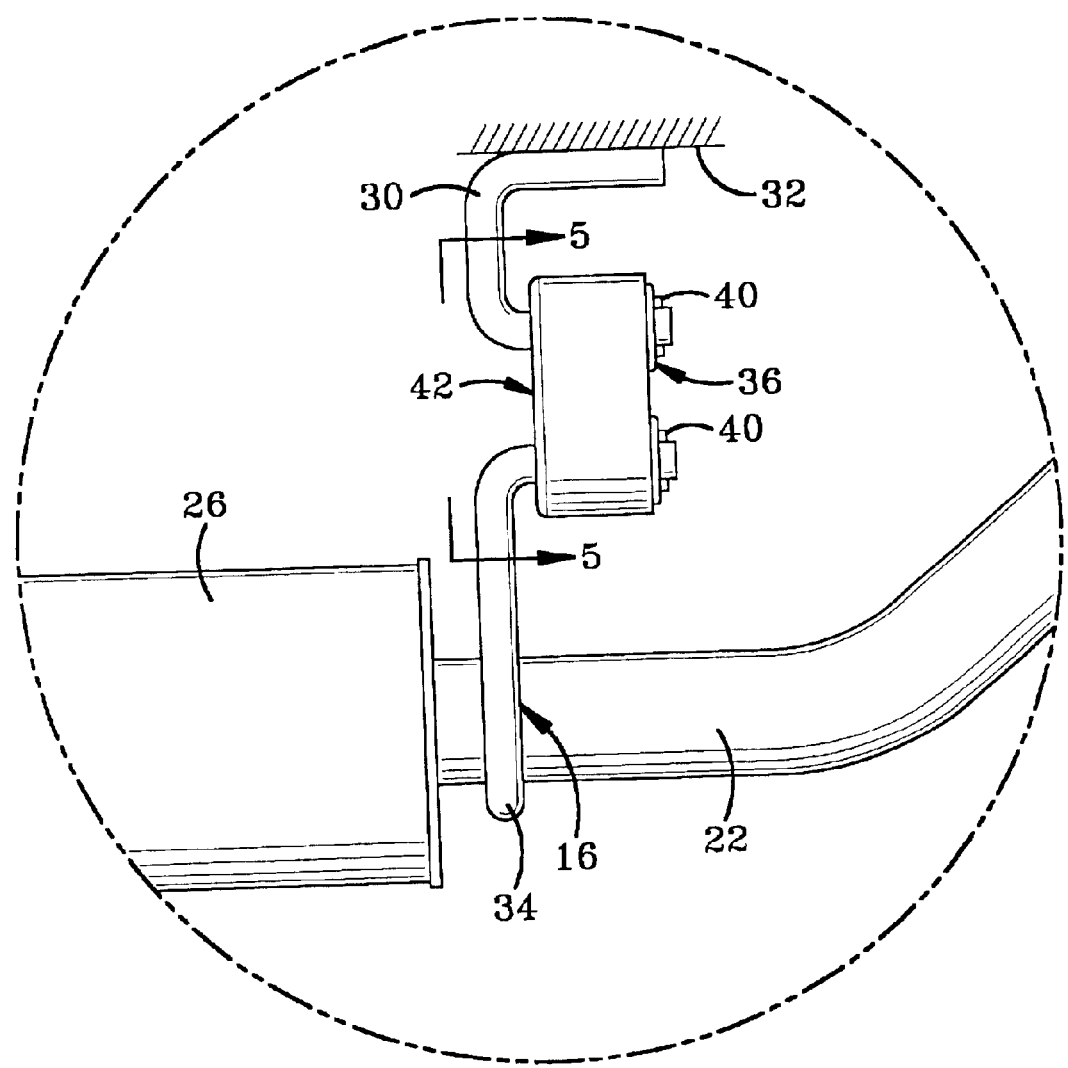
FIG. 4 is an enlarged side view of the highlighted area of the exhaust system shown in FIG. 1.

Referring to FIGS. 1 and 4, exhaust system 14 is connected to body 12 by hangers 16. Each hanger 16 includes an upper arm 30 that is welded, bolted or otherwise attached to the chassis 32 of body 12. Lower arm 34 is connected to pipe section 22. A vibration insulator 36 is disposed between upper and lower arms 30, 34.

Figure 6:
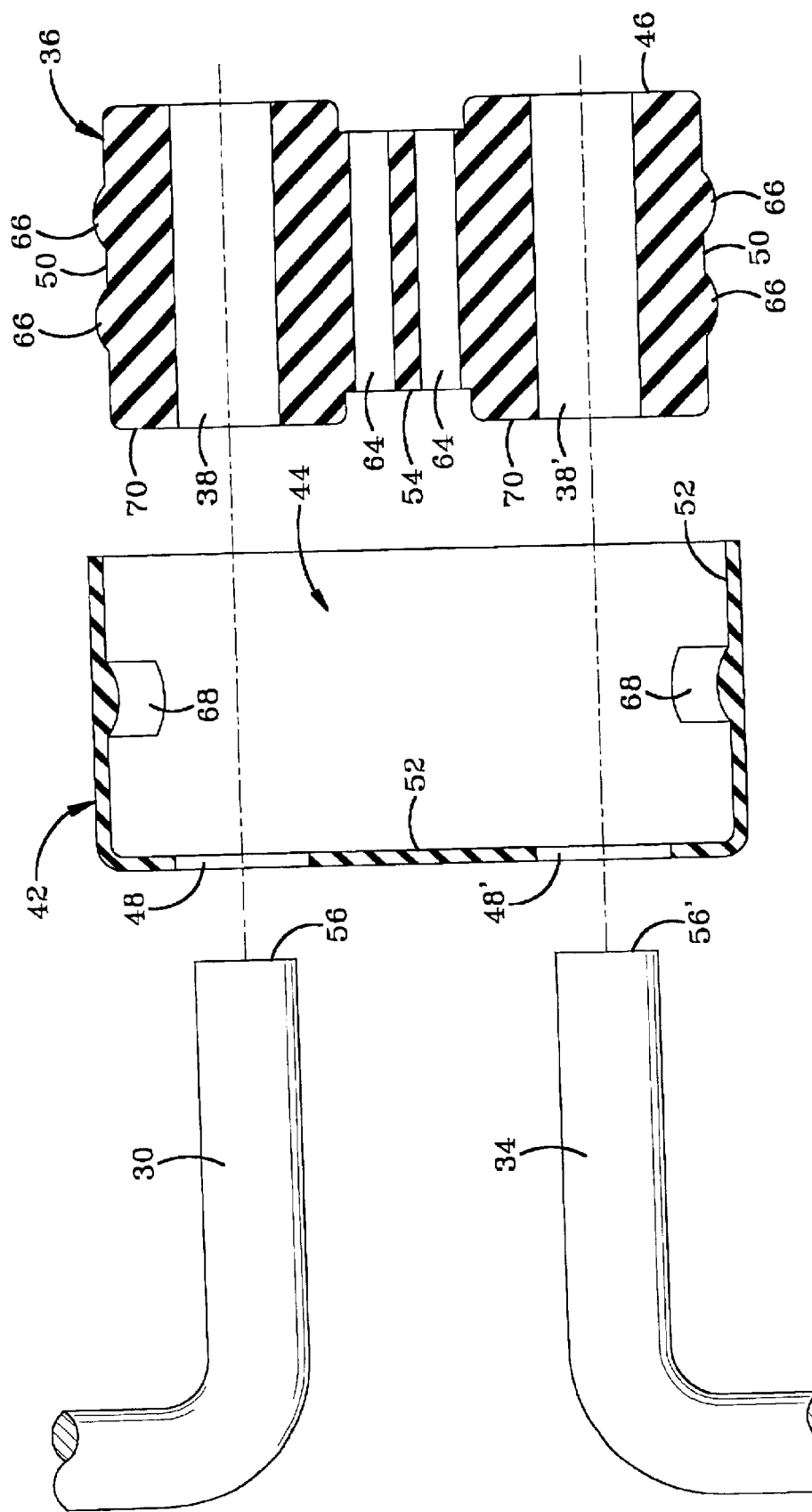
FIG. 6 is an exploded partial cross-section of the vibration insulator, heat shield and hanger bars.

Vibration insulator 36 defines two bores 38, 38' (FIG. 2) through which upper arm 30 and lower arm 34 may be received. Vibration insulator 36 may be manufactured in any shape or configuration and is typically manufactured from an elastomer, such as EPDM. EPDM is able to withstand temperatures ranging from 210 to 250 degrees Fahrenheit and is flexible enough to dampen vibrations. In the preferred embodiment, insulator 36 may be manufactured of any elastomer covered by ASTM D2000 classifications M and DA, although other compounds may be used without departing from the spirit of the present invention. Upper arm 30 is received through bore 38 and lower arm 34 is received through bore 38'. A suitable lock 40 such as a flange on arms 30 and 34, a pin, a cap, or other types of known elements prevents insulator 36 from sliding off of arms 30 and 34 when insulator 36 is in use. In another embodiment, insulator 36 is frictionally held on arms 30 and 34. A cup-shaped heat shield 42 (FIG. 6) defines a central cavity 44 into which insulator 36 may be received. Shield 42 is configured to generally cover insulator 36 while allowing the rear face 46 of insulator 36 to remain uncovered. This configuration allows heat shield 42 to be easily placed over or removed from insulator 36. Heat shield 42 defines two apertures 48, 48'. Upper arm 30 may be received through aperture 48 and lower arm 34 may be received through aperture 48'. Heat shield 42 is essentially diamond shaped having rounded corners 67 and straight sidewalls 65 extending between the rounded corners. However, heat shield 42 may take a variety of configurations without departing from the spirit of the present invention. The inner perimeter surface 52 of heat shield 42 includes at least two beads 68 for retention of the insulator 36. Heat shield 42 may be manufactured from a silicone elastomer, fluorolastomer, ethylene acrylic or any other suitable material. Suitable metals and fabric could also be used. A suitable silicone elastomer would be SAE J200 M8GE 406 A19 B37 G11 selected from a group of compounds having the following properties:

A19—Heat resistance testing up to 225° for 70 hours

B37—Compression set testing at 175° for 22 hours.

G11—Tear resistance: 5 kN/m under 7 MPa load.

In the preferred embodiment, the silicone elastomer is taken from the group ASTM D2000 classification GE, FC, FE and FK, although others could be used without departing from the spirit of the present invention. These silicone elastomers are designed to withstand high heat without failing, melting or drooping. Shield 42 is preferably soft and flexible so that it may be easily snapped into position over insulator 36 and is able to flex with the insulator. Positioning heat shield 42 over insulator 36 allows for the superior strength and structural properties of EPDM to be utilized, while enabling insulator 36 to withstand higher temperatures.

Figure 2:
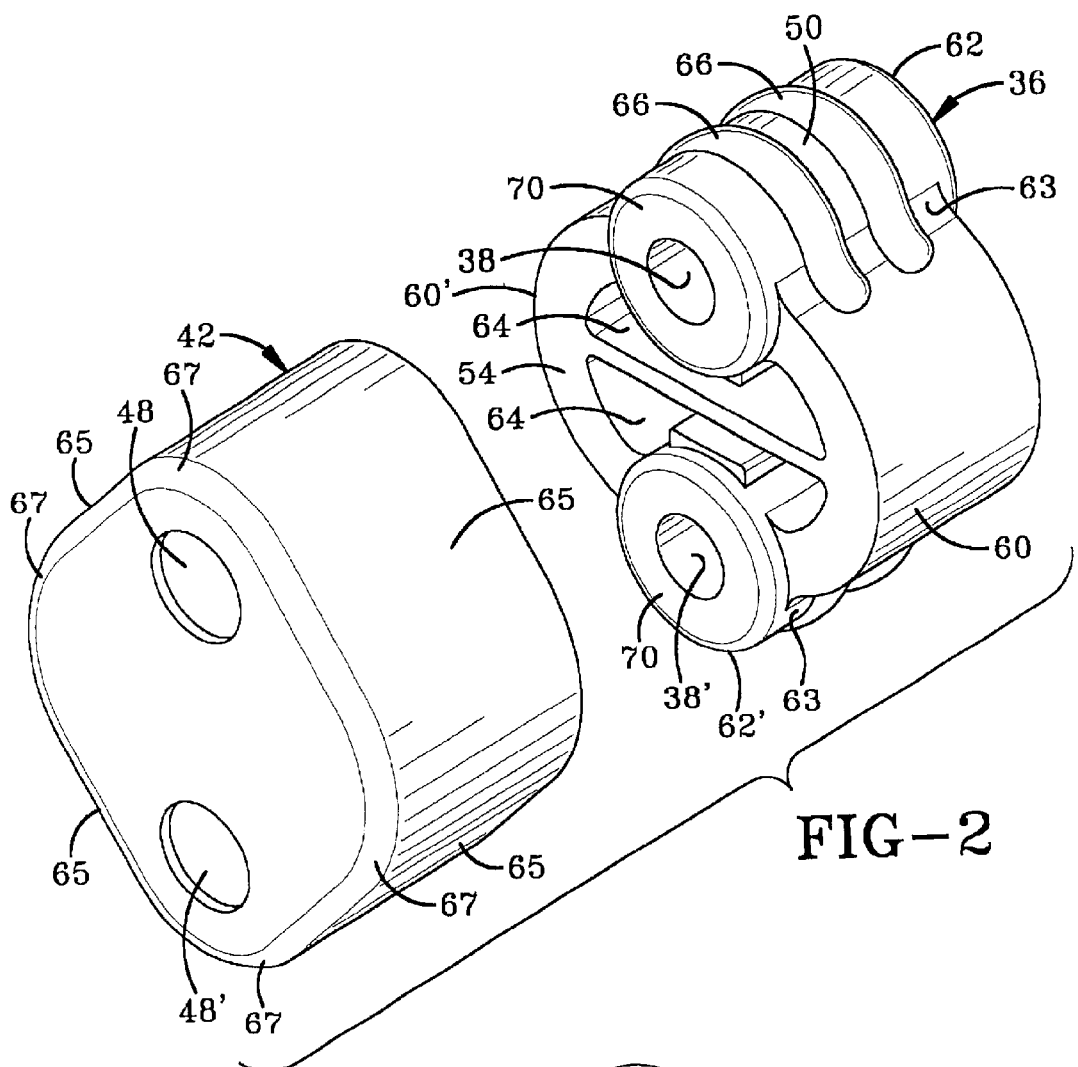
FIG. 2 is an exploded perspective view of a vibration insulator and the heat shield.
Figure 3:
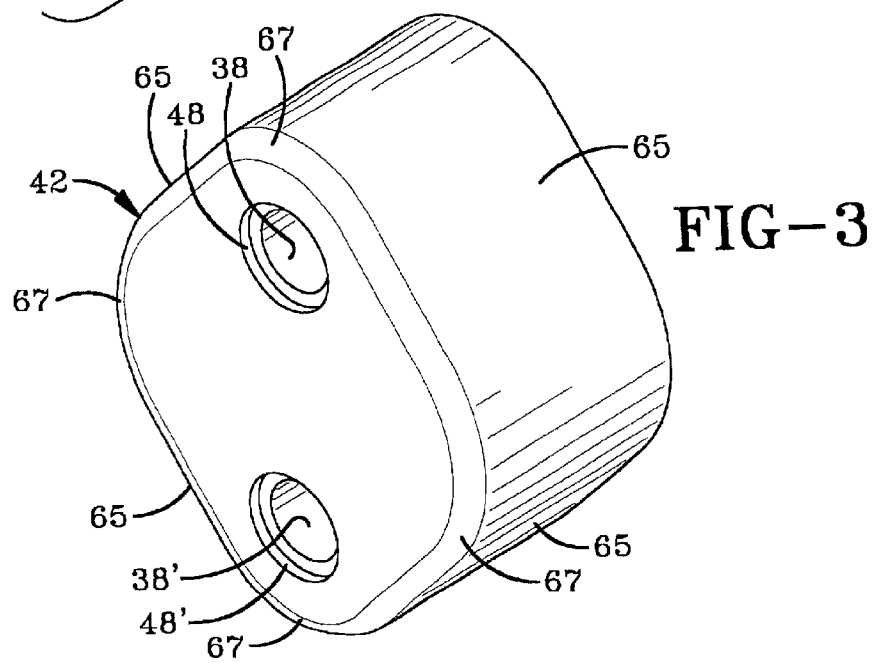
FIG. 3 is a perspective view of the heat shield.

Insulator 36 shown in FIGS. 2 and 7 is known in the prior art and other insulators may be used in combination with the heat shield of the invention without departing from the scope of this invention. Insulator 36 as shown in FIG. 2, is basically clover shaped, having four round protuberances, two of the protuberances 60, 60' being somewhat larger than the other protuberances 62, 62'. Bores 38,38' are defined in the smaller protuberances 62, 62'. Valleys or depressions 63 (FIG. 5) are defined between adjacent protuberances 60,62 and the straight sidewalls 65 of heat shield 42 to provide air gaps that insulate insulator 36 from heat. Vibration insulator 36 two cavities 64, two on front surface 54 and two on the rear surface (not shown). Front surface 54 and rear surface (not shown) of insulator 36 are basically identical in appearance. Projections 66 are formed on outer perimeter surface 50 of insulator 36. Heat shield 42 is held on insulator 36 by friction and the cooperation of beads 68 on heat shield 42 with projections 66 on insulator 36. The shape of insulator 36 with protuberances 60,60', 62, 62', cavities 64 and projections 66 allows for the creation of air spaces between insulator 36 and heat shield 42. Additionally, front surfaces 54 of protuberances 60,60' are set back a small distance from the front surface 70 of protuberance 62,62' and this creates an additional air space 72 between front surface 54 and inner perimeter surface 52 of heat shield 42. These air spaces allow for the dispersion of heat from the insulator/shield 36,42 combination.

The device of the present invention is used in the following manner. In order to install shield 42, lock 40 is released (when present) and insulator 36 is slipped off upper and lower arms 30, 34. Heat shield 42 is positioned over insulator 36 so that the outer peripheral wall 50 of insulator 36 slides into central cavity 44 and along inner peripheral wall 52 of shield 42. Shield 42 and insulator 36 are pushed together until front surface 70 of protuberances 62, 62' abuts inner surface 52 of shield 42. Apertures 48, 48' and bores 38, 38' are aligned with each other. Additionally, beads 68 interlock with projections 66. The shield/insulator combination is then brought toward upper and lower arms 30, 34. Free ends 56, 56' of upper and lower arms 30, 34 are inserted through apertures 48, 48' and aligned bores 38, 38'. Lock 40 (if required) is then applied to upper and lower arms 30, 34 to lock the shield/insulator component onto arms 30, 34. Alternatively, shield 42 and insulator 36 may be forced over lock 40 while it is in place. Similarly, shield 42 may be applied to insulator 36 during original equipment manufacturing. In this situation, insulator 36 and shield 42 would be shipped to the manufacturer as an assembly and applied when the vehicle is being manufactured.

In order to replace either shield 42 or insulator 36, lock 40 is released, the shield/insulator component 42/36 is removed by simply pulling it off free ends 56, 56' of arms 30, 34 or the shield/insulator component 42/46 can be pulled over lock 40. If it is desired to remove shield 42 from insulator 36, the mechanic merely needs to insert his/her fingers between the outer peripheral wall 50 of insulator 36 and inner peripheral wall 52, and then to pull shield 42 off insulator 36. Because shield 42 is manufactured from a soft, flexible material it may be easily snapped into place over insulator 36 and may be just as easily removed.

While this method of positioning shield 42 over insulator 36 has been described, shield 42 may be inserted onto upper and lower arms 30, 34 first and then insulator 36 may be inserted onto upper and lower arms 30, 34 and then pushed into shield 42. The heat shield thermally insulating the vibration insulator from heat generated by the vehicle exhaust system.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

What is claimed is:

1. In combination, a heat shield and a vibration insulator for a vehicle exhaust system; the combination comprising:
   the vibration insulator having a frame with an outer surface, a front surface and a rear surface; and
   the flexible, non-metallic heat shield formed of a heat resistant material and having a cup-shaped body defining a chamber with an inner surface said vibration insulator being held within the chamber, wherein at least a portion of the outer surface and front surface of the vibration insulator lies in contact with the inner surface of the chamber; the heat shield thermally insulating the vibration insulator from heat generated by the vehicle exhaust system.

2. The combination of claim 1, wherein the heat shield is manufactured from an elastomer.

3. The combination of claim 2, wherein the heat shield is manufactured from a silicone elastomer.

4. The combination of claim 3, wherein the heat shield is manufactured from a silicone elastomer selected from the group ASTM D2000 classification GE, FC, FE and FK.

5. The combination of claim 2, wherein the elastomer is fluorolastomer.

6. The combination of claim 2, wherein the body is manufactured from ethylene acrylic.

7. The combination of claim 1, in which the heat shield is frictionally secured to the vibration insulator.

8. In combination, a heat shield and a vibration insulator for a vehicle exhaust system; the combination comprising:
   the vibration insulator having a frame with an outer surface; a front surface and a rear surface; and
   the heat shield having a cup-shaped body defining a chamber; the vibration insulator being substantially disposed within the chamber with the heat shield adapted to protect the vibration insulator against an external heat source; wherein the heat shield includes at least one internal bead projecting into the chamber; the bead at least partially retaining the heat shield on the vibration insulator.

9. The combination of claim 8, wherein the vibration insulator includes an external projection; the projection cooperating with the bead to hold the heat shield on the vibration insulator.

10. The combination of claim 9, wherein the heat shield and insulator form air spaces between them.

11. The combination of claim 10, wherein the frame of the insulator includes protuberances and valleys defines between the protuberances; wherein the body of the heat shield includes sidewalls and a bottom wall; and the air spaces are formed between the valleys of the frame and the sidewalls of the heat shield.

12. The combination of claim 8, wherein the vibration insulator defines at least one aperture extending from the front surface through to the rear surface; and wherein the heat shield chamber has sidewalls and a bottom wall and the bottom wall defines at least one hole therein; and when the vibration insulator is received within the chamber of the heat shield, the aperture in the vibration insulator substantially aligns with the hole in the heat shield.

13. The combination of claim 8, in which the heat shield is frictionally secured to the vibration insulator.

14. In combination, a heat shield and a vibration insulator for a vehicle exhaust system; the combination comprising:
   the vibration insulator having a frame with an outer surface, a front surface and a rear surface; the frame of the vibration insulator including protuberances which have a second front surface that extends further outwardly from the frame than the front surface of the frame; and
   the heat shield having a cup-shaped body defining a chamber; the vibration insulator being substantially disposed within the chamber so that the heat shield is adapted to protect the vibration insulator against an external heat source; and wherein the second front surface of the protuberances abuts the heat shield and air spaces are formed between the heat shield and the front surface of the frame of the vibration insulator.

15. The combination of claim 14; wherein the body of the heat shield is shaped like a diamond with rounded corners.

16. The combination of claim 15, wherein the body includes straight sidewalls extending between the rounded corners.

17. The combination of claim 14, wherein the vibration insulator defines at least one aperture extending from the front surface through to the rear surface; and wherein the heat shield chamber has sidewalls and a bottom wall and the bottom wall defines at least one hole therein; and when the vibration insulator is received within the chamber of the heat shield, the aperture in the vibration insulator substantially aligns with the hole in the heat shield.

18. An improved motor vehicle having a chassis and an exhaust system, the exhaust system having an exhaust pipe and a hanger connecting the exhaust pipe to the chassis; a vibration insulator disposed on the hanger, the vibration insulator having a frame with an outer surface and a front surface; the improvement comprising:
   a flexible, non-metallic heat shield formed of a heat resistant material; the heat shield having a cup-shaped body defining a chamber that has an inner lining; the chamber sized to receive the vibration insulator so that when the vibration insulator is held within the chamber, the inner lining of the chamber contacts at least a portion of the outer surface and the front surface of the vibration insulator; and wherein the heat shield thermally insulates the vibration insulator from heat generated by the exhaust system.

19. The improved motor vehicle of claim 18, wherein the heat shield is manufactured from a flexible, heat resistant material.

20. The improved motor vehicle of claim 19, wherein the heat shield is manufactured from an elastomer.

21. The improved motor vehicle of claim 20, wherein the heat shield is manufactured from a silicone elastomer.

22. The improved motor vehicle of claim 21, wherein the heat shield is manufactured from a silicone elastomer selected from the group ASTM D2000 classification GE, FC, FE and FK.

23. The improved motor vehicle of claim 20, wherein the elastomer is fluorolastomer.

24. The improved motor vehicle of claim 19, wherein the body is manufactured from ethylene acrylic.

25. The improved motor vehicle of claim 18, wherein the heat shield provides air gaps between the heat shield and the insulator.

26. In combination, a heat shield and a vibration insulator for a vehicle exhaust system; the combination comprising:
   the vibration insulator having a frame with an outer surface; a front surface and a rear surface; the vibration insulator defining at least one aperture extending from the front surface through to the rear surface;

the flexible, non-metallic heat shield formed from a heat resistant material; the heat shield having a cup-shaped body defining a chamber; the chamber having sidewalls and a bottom wall, the bottom wall defining at least one hole therein; and when the vibration insulator is received within the chamber of the heat shield; the aperture in the vibration insulator substantially aligns with the hole in the heat shield; the heat shield thermally insulates the vibration insulator from heat generated by the vehicle exhaust system.

27. The combination of claim 26, wherein the vibration insulator defines two apertures extending from the front surface through the rear surface thereof; and wherein the bottom wall of the heat shield defines two holes therein, and the positions of the two apertures in the vibration insulator substantially align with the two holes in the heat shield; and the vibration insulator and heat shield are adapted to be connected to a vehicle body and the exhaust system via two connectors and the connectors are receivable through the aligned apertures and holes.

28. The combination of claim 27, wherein the heat shield is manufactured from a silicone elastomer.

29. In combination, a heat shield and a vibration insulator for a vehicle exhaust system; the combination comprising:
the vibration insulator which flexes, stretches and contracts in response to movements in the vehicle exhaust system; and
the non-metallic heat shield formed of a heat resistant, flexible material and having a cup-shaped body defining a chamber for receiving said vibration insulator therein; and wherein the heat shield thermally insulates the vibration insulator from heat generated by the vehicle exhaust system; whereby the heat shield flexes, stretches and contracts along with the vibration insulator.

30. The combination of claim 29, wherein the heat shield is manufactured from an elastomer.

31. The combination of claim 30, wherein the heat shield is manufactured from a silicone elastomer.

32. The combination of claim 31, wherein the heat shield is manufactured from a silicone elastomer selected from the group ASTM D2000 classification GE, FC, FE and FK.

33. The combination of claim 30, wherein the elastomer is fluorolastomer.

34. The combination of claim 30, wherein the body is manufactured from ethylene acrylic.

* * * * *